May 14, 1968    D. D. WALTERS    3,382,600
FISHING LURE
Filed May 3, 1965

INVENTOR.
*Darrel D. Walters*

3,382,600
FISHING LURE
Darrel D. Walters, 45 Mill St.,
Springboro, Ohio 45066
Filed May 3, 1965, Ser. No. 452,595
1 Claim. (Cl. 43—42.15)

ABSTRACT OF THE DISCLOSURE

A fishing lure adapted to simulate a small animal and including forward and rear cylindrical body members interconnected for horizontal pivotal movement. A nose portion extends sharply downward from the forward body portion and a concave surface is provided in the nose and forward body member. A stiff but flexible tail extends centrally from the rear surface of the rear body member, and treble hooks extend downwardly from the rear portion of the rear body member and the central portion of the forward body member.

This invention relates to fishing tackle, and more particularly to an improved artificial lure.

It is therefore the main purpose of this invention to provide a lure which will have a violent wiggling action as it is pulled through the water.

Another object of this invention is to provide a lure which will have a forward and rear body member which will be attached by screw eye means in order to simulate the wiggling motion of natural bait.

Still another object of this invention is to provide a lure which will have a downward slope in the nose in order to create an aqua dynamic diving motion when the lure is pulled through the water and the overall vigorous motion of the lure will also cause the tail of the lure to vigorously wiggle when the lure is trolled or pulled through the water.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

According to this invention, a lure 10 is provided with a forward body member 11 and a rear body member 12, both of which are made of wood or other suitable material. Forward body member 11 and rear body member 12 receive a pair of screw eyes 13 which allows them to impart a wiggling action to the lure when it is pulled through the water and the screw eyes 13 hookingly engage each other.

Figure 1:
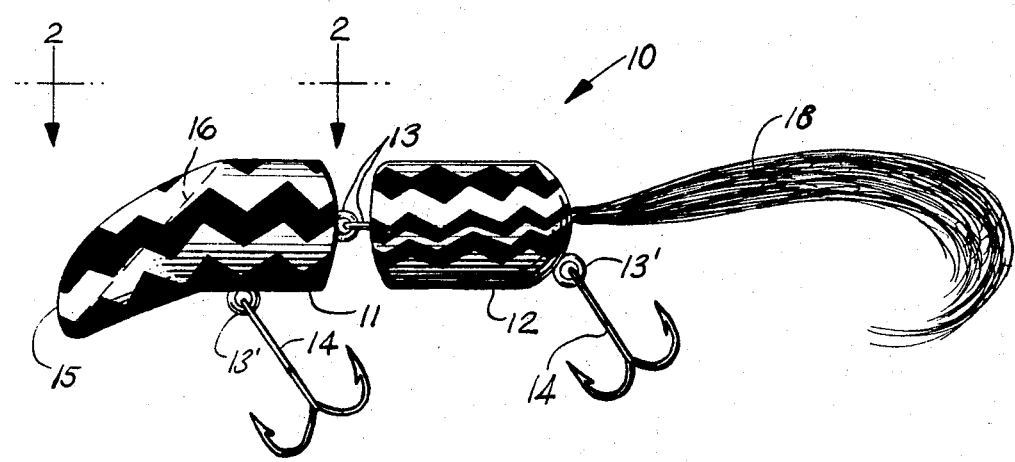
FIGURE 1 is a side view of this invention shown in elevation.
Figure 2:
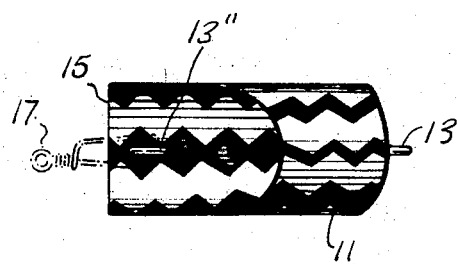
FIGURE 2 is a plan view taken along the lines 2—2 of FIGURE 1 and viewed in a direction indicated by the arrows.

Body member 11 is formed with a rear cylindrical section terminating in a smoothly convex rear end and a forward nose section 15 which breaks sharply downwardly from its juncture with the forward portion of the rear section. Nose section 15, as shown in FIGURE 2, is formed with a horizontal width substantially equal to the diameter of the rear section. Body member 12 is formed with a cylindrical shape having a diameter substantially equal to the diameter of the rear cylindrical section of the body member 11. A screw eye 13' is secured to the lower portion of body member 11 adjacent the juncture between the rear cylindrical section and the nose section and a screw eye 13' is secured to the rear convex end of body member 12 and a treble hook 14 is received within each screw eye 13' in order to hook a fish. The nose 15 of forward body member 11 is angularly sloped downwards in order to cause an aqua dynamic diving motion for lure 10 and the upper surface 16 is concave to direct the water impacting upon the surface 16 upwards and away to increase the vigorous wiggling action of lure 10. A screw eye 13'' is secured at the concave surface 16 below the longitudinal axis of the rear section of the nose member and freely receives a leader 17 (shown in phantom lines) in FIGURE 2 of the drawing. An elongated tail 18 constructed of a cluster of flexible hairs or the like is secured to the center of the rear convex end of rear body member 12 and extends axially rearwardly therefrom above the rear treble hook 14 and tail 18 vigorously wiggles simultaneously with body members 11 and 12.

What I now claim is:

1. A fishing lure adapted to provide an accurate imitation of a small animal comprising, forward and rear body members, said rear body member being cylindrical having convex smoothly rounded front and rear ends, said forward body member having a cylindrical rear section with a convex rounded rear end and a forward nose section, said cylindrical rear section and said rear body member having equal outer diameters, means interconnecting said front end of said rear member and said rear section of said front member for pivotal movement therebetween, said nose section on said forward body member breaking sharply downwardly from its juncture with said cylindrical rear section and terminating below the adjacent outer surface of said cylindrical rear section, said nose section having a horizontal width along its entire length equal to the diameter of said rear section which presents a square leading edge on said nose section, means defining a deep concave surface in the top surface of said nose section adapted to provide a scooping action causing said body members to wiggle back and forth in a horizontal plane to simulate the natural movements of a small animal, hook means including a treble hook on said forward body member below the center of said cylindrical rear section and adjacent said juncture with said nose section, said hook means also including a treble hook on the lower portion of said rear convex end of said rear body member, a stiff compact but flexible tail extending axially rearwardly from the center of said convex rear end of said rear body member in protective relation above the second named treble hook, and an eyelet secured to the top surface of said nose section below the longitudinal axis of said cylindrical rear section for connection to a leader.

References Cited

UNITED STATES PATENTS

| | | | |
|---|---|---|---|
| 2,559,542 | 7/1951 | Mintner | 43—42.15 X |
| 2,789,385 | 4/1957 | Seeger | 43—42.15 |
| 1,510,923 | 10/1924 | Cosey | 43—42.15 X |

SAMUEL KOREN, *Primary Examiner.*

WARNER H. CAMP, *Examiner.*